United States Patent [19]

Nowlin

[11] 4,189,554
[45] Feb. 19, 1980

[54] MAGNESIUM REDUCING AGENT PREPARED IN ABSENCE OF COMPLEXING DILUENT MILLED WITH ORGANOALUMINUM

[75] Inventor: Oscar D. Nowlin, Bartlesville, Okla.

[73] Assignee: Phillips Petroleum Company, Bartlesville, Okla.

[21] Appl. No.: 888,815

[22] Filed: Mar. 21, 1978

Related U.S. Application Data

[63] Continuation-in-part of Ser. No. 686,605, May 14, 1976, abandoned.

[51] Int. Cl.² .......................... C08F 4/66; C08F 10/02
[52] U.S. Cl. ................................ 526/125; 252/429 B; 252/429 C; 526/144; 526/151; 526/352; 526/906
[58] Field of Search ....................... 252/429 C, 429 B; 526/125, 144, 151

[56] References Cited

U.S. PATENT DOCUMENTS

| | | | |
|---|---|---|---|
| 3,109,838 | 11/1963 | Chalt et al. | 526/165 |
| 3,392,162 | 7/1968 | Ziegler et al. | 526/151 |

FOREIGN PATENT DOCUMENTS

| | | | |
|---|---|---|---|
| 1299862 | 12/1962 | United Kingdom | 526/151 |
| 1235062 | 6/1971 | United Kingdom | 526/151 |
| 1373982 | 11/1974 | United Kingdom | 526/124 |
| 1391322 | 4/1975 | United Kingdom | 526/151 |

Primary Examiner—Edward J. Smith

[57] ABSTRACT

A magnesium reducing agent is prepared by reacting an organic halide and magnesium metal in the absence of an ether or other complexing diluent, preferably in the absence of any extraneous diluent, to form a magnesium reducing agent which is thereafter milled with an organoaluminum compound to form a cocatalyst. In one embodiment the halide is added dropwise to the magnesium metal. The resulting milled product is thereafter contacted with a titanium tetrahalide to form a catalyst. This catalyst is suitable for olefin polymerization and particularly suitable for the polymerization of ethylene.

16 Claims, No Drawings

MAGNESIUM REDUCING AGENT PREPARED IN ABSENCE OF COMPLEXING DILUENT MILLED WITH ORGANOALUMINUM

CROSS REFERENCE TO COPENDING APPLICATION

This is a continuation-in-part of copending application Ser. No. 686,605, filed May 14, 1976, now abandoned.

BACKGROUND OF THE INVENTION

This invention relates to magnesium reduced titanium tetrahalide catalyst systems.

It is known to utilize true Grignard reagents of the formula RMgX prepared in the presence of an ether to reduce titanium tetrahalide in the production of catalysts. It is also known to produce what is termed in the art a "solventless" Grignard, which is produced by reacting magnesium metal with an organic halide in the presence of a solvent which is designated as a non-solvating solvent (i.e., an inert non-complexing diluent) such as a hydrocarbon as ditinguished from an ether. This use of true Grignard reagents presents serious difficulties, however, in the production of certain catalysts, particularly in the production of olefin polymerization catalysts, in view of the fact that the large amount of ether is difficult to remove and the remaining complexed ether can reduce the effectiveness of olefin polymer catalysts systems prepared with the thus treated Grignard reagents.

Because of greater process economics, it is desirable to carry out olefin polymerization reactions, particularly polymerization reactions involving ethylene and predominantly ethylene copolymers, and an inert diluent at a temperature at which the resulting polymer does not go into solution, with the polymer being recovered without elaborate steps to remove the catalyst. In order for this more economical method of manufacture to be feasible from a practical standpoint the catalyst must be capable of producing polymer in high productivities in order to maintain the residual catalyst level in the final polymer at a very low level.

SUMMARY OF THE INVENTION

It is an object of this invention to provide a magnesium reducing agent prepared in the absence of an ether;

It is a further object of this invention to provide a magnesium reducing agent prepared in the absence of any extraneous diluent;

It is yet a further object of this invention to provide a catalyst system capable of giving high productivity; and It is yet a further object of this invention to provide an improved catalyst for the polymerization of olefins such as ethylene without the necessity for elaborate catalyst removal procedures from polymers thus produced.

In accordance with this invention, an organic halide is reacted with magnesium metal in the absence of any complexing diluent to produce a magnesium reducing agent which is milled with an organoaluminum compound, to produce a cocatalyst which is thereafter contacted with a titanium tetrahalide.

DESCRIPTION OF THE PREFERRED EMBODIMENTS

The organic halide is a saturated or unsaturated hydrocarbyl halide of formula RX in which X represents a halogen atom, preferably chlorine or bromine, and R is selected from an alkynyl, alkenyl, alkyl, aryl, cycloalkenyl and cycloalkyl radicals and combinations thereof such as aralkyl and the like containing from 1 to about 12 carbon atoms per molecule. The organic halide can also be a polyhalogenated hydrocarbyl halide of formula $R'X_2$ where X represents a halogen atom as before and R' is a saturated divalent aliphatic hydrocarbyl radical containing from 2 to about 10 carbon atoms per molecule. Exemplary orgaic halides include methyl chloride, n-butyl bromide, n-pentyl chloride, n-dodecyl chloride, 1,2-dibromoethane, 1,4-dichlorobutane, 1,10-dibromodecane, cyclohexyl chloride, bromobenzene and the like. A primary alkyl halide such as n-pentyl chloride is a presently preferred compound.

The magnesium is in the form of the free metal, preferably in the form of a powder.

The molar/gram atom ratio of organic halide to magnesium can vary from 0.25:1 to 1:0.25, but is preferably about stoichiometric (1/1 moles orgaic halide/gram atoms magnesium.

The organic halide is reacted with the magnesium metal. One method involves adding the halide dropwise preferably while the magnesium metal is being stirred with the addition taking place slowly, preferably over a time of 1 to 10 hours. It is preferred that this be done in the absence of any extraneous diluent, the only liquid being present being unreacted organic halide. It is also possible to utilize an inert diluent such as an unreactive hydrocarbon in which case the magnesium powder is dispersed in the hydrocarbon. Suitable hydrocarbons include pentane, hexane, cyclohexane, heptane, and other hydrocarbons of the type known in the art for use as diluents or solvents in olefin polymerization. In either event, ether and other polar complexing diluents are avoided. Ether is avoided, as noted hereinabove, because it is difficult to remove large quantities of ether and ether complexes which can reduce the activity of the catalyst system. In addition, the presence of the ether results in the formation of a substantially different product and even the presence of an inert hydrocarbon results in the formation of a different product than is obtained without solvent. Generally this reaction is carried out at the reflux temperature for the organic halide, which for pentyl chloride is 108° C. Temperatures of 80°–110° C. are particularly suitable.

Other methods of reacting the halide with the magnesium metal include shaving magnesium metal from a large bar or the like into the organic halide, or milling the halide and magnesium metal. Particularly in this last embodiment the presence of a non-complexing diluent to carry away heat may be preferred. The milling, for instance, with a conventional roll mill or a conventional ball or rod mill maintains the proper surface while the non-complexing diluent carries away heat. A vibrating ball mill can also be used, such mills being commercially available under the designation Vibratom available from Schutz-O'Neill Co., Div., Parten Machinery Co., Minneapolis, Minn. Laboratory experiments have demonstrated, however, that care must be exercised if all of the halide and magnesium are combined essentially simultaneously as the reaction gives off a great deal of heat. In such a case the use of a non-reactive diluent to carry off the heat or the use of a relatively small amount of reactants for the size of the reaction vessel is recommended.

A typical analysis of the magnesium reducing agent of this invention is:

| Hydrocarbon Soluble Components | |
|---|---|
| Compound | Weight Percent |
| Di-n-pentylmagnesium | 25.0 |
| Decane | 8.2 |
| Di-n-decylmagnesium | 1.1 |
| Magnesium n-pentoxide | 0.6 |
| Magnesium chloride | 55.2 |
| Magnesium | 4.9 |
| Chloromagnesium hydride | 2.3 |
| n-Pentylmagnesium chloride | 2.0 |
| Magnesium n-pentoxide | 0.7 |

This is shown for illustrated purposes and is not intended to limit the scope of the invention to the dropwise addition of n-pentyl chloride as used for this anlysis. Substantial variation in the exact analysis from that shown is obtained if a different halogen is used or if a different organo radial is substituted for the n-pentyl. However, in all cases, whatever method is used to react the halide and magnesium, there is present in accordance with the invention a substantial amount (at least 10 weight percent) each of the diorganomagnesium compound and the magnesium halide. It is the reaction mixture that is the magnesium reducing agent as defined herein, i.e., the entire reaction mixture including both hydrocarbon soluble components and hydrocarbon insoluble components.

The term "in the absence of any extraneous diluent" (i.e., added diluent) as used throughout this specification and claims is meant to exclude the introduction of any complxing solvent or any non-complexing or inert diluent such as a hydrocarbon. Of course, the organic halide itself is a liquid. Also after the reaction is essentially complete, an inert diluent or solvent such as hydrocarbon may be added to facilitate further handling.

The resulting magnesium reducing agent formed from the reaction of the organic halide and the magnesium is then milled with an organoaluminum compound to form a cocatalyst. Any conventional milling technique known in the art can be utilized such as ball milling, rod milling, pebble milling, and vibratory ball milling. The term milling as used herein is also meant to encompass high speed sheer stirring, colloid milling or passage through an orifice of a homogenizing valve at high pressure, for instance, 1,000 psig or greater. All of these produce intensive milling conditions wherein heat is generated and agglomerates are broken up. Milling times will generally be in the range of 0.1 to 20, preferably 1 to 10, more preferably 2 to 5 hours for conventional milling techniques. Use of vibratory ball milling reduces the required times by a factor of about 10.

The milling process is generally carried out in a dry, inert atmosphere at ambient temperatures with cooling not normally required. If desired, the milling can take place in the presence of a dry hydrocarbon diluent such as hexane, heptane, cyclohexane, heptane, and the like which is inert, non-solvating with respect to the magnesium reducing agent and non-reactive with respect to the subsequent polymerization reaction. Alternatively, no diluent at all can be used. It is frequently preferred, however, to utilize an inert hydrocarbon diluent at this point even in the preferred embodiments of the invention wherein no extraneous diluent of any kind is utilized during the reaction of the organic halide and the magnesium. The presence of an inert diluent at this point does not adversely affect the superior results obtained by carrying out the reaction between the organic halide and the magnesium in the absence of any extraneous diluent. The temperature during milling will generally be 40°–110° C., preferably 50°–70° C. The resulting mixture can be conveniently stored in a dry vessel under an inert atmosphere until it or a portion thereof is needed for use in a polymerization process.

The organoaluminum compound is a hydrocarbylaluminum halide compound of formula $R''_2AlX$ in which X is a halogen atom, preferably chlorine or bromine, and each $R''$ is the same or a different radical selected from alkyl and aryl radicals having from 1 to about 12 carbon atoms. Exemplary compounds include dimethylaluminum bromide, diethylaluminum chloride, diphenylaluminum chloride, ethylphenylaluminum chloride, n-dodecylaluminum bromide and the like. A presently preferred compound is diethylaluminum chloride.

The resulting milled product referred to herein as the cocatalyst is then contacted with titanium tetrahalide wherein the halide is one of chlorine, bromine, or iodine, preferably titanium tetrachloride. This may conveniently be done by simply introducing the milled product and the titanium tetrahalide in separate streams into the reactor.

It is within the scope of this invention to employ one or more adjuvants, these being polar organic compounds, i.e., Lewis bases (electron donor compounds) with the titanium tetrahalide component or the cocatalyst component or both. Suitable compounds for this purpose are described in U.S. Pat. No. 3,642,746, the disclosure of which is incorporated by reference. They include alcoholates, aldehydes, amides, amines, arsines, esters, ethers, ketones, nitriles, phosphines, phosphites, phosphoramides, sulfones, sulfoxides and stibines. Exemplary compounds include sodium ethoxide, benzaldehyde, acetamide, triethylamine, trioctyl arsine, ethyl acetate, diethyl ether, acetone, benzonitrile, triphenyl phosphine, triphenyl phosphite, hexamethyl phosphoric triamide, dimethyl sulfone, dibutyl sulfoxide, and triethyl stibine triphenyl phosphite, triethylamine and dimethyl analine.

Preferred esters are the lower alkyl esters (i.e., 1 to 4 carbon atoms per molecule) of benzoic acid which may be additionally substituted in the para position to the carboxyl group with a monovalent radical selected from the group consisting of —F, —Cl, —Br, —I, —OH, —OR''', —OOCR''', —SH, —NH, —NR'''$_2$, —NHCOR''', —NO$_2$, —CN, —CHO, —COR''', —COOR''', —CONH$_2$, —CONR'''$_2$, —SO$_2$R''', and —CF$_3$. The R''' can also be an alkyl radical having 1–4 carbon atoms. Exemplary compounds include ethyl anisate (ethyl-p-methoxybenzoate), methyl benzoate, ethyl benzoate, ethyl p-dimethylaminobenzoate, ethyl p-fluorobenzoate, ethyl p-trifluoromethylbenzoate, methyl p-hydroxybenzoate, methyl p-acetylbenzoate, methyl p-nitrobenzoate, ethyl p-mercaptobenzoate and mixtures thereof. Particularly preferred compounds are ethyl anisate and ethyl benzoate. Generally if an adjuvant is used at all, it is used in the polymerization of propylene. In the preferred embodiments of this invention where ethylene is polymerized, an adjuvant is generally not used.

The molar ratio of organoaluminum compound(s) to adjuvant(s) is generally in the range of about 1:1 to about 300:1. The atom ratio of aluminum to magnesium can range from about 0.1:1 to about 4:1, more preferably from about 0.5:1 to about 2:1. The molar ratio of titanium compound to adjuvant(s) is generally in the range of about 1:1 to about 200:1. The atom ratio of aluminum to titanium can range from about 20:1 to about 10,000:1, more preferably from about 75:1 to about 5,000:1.

The catalyst component of this invention can be used unsupported or supported on a particulate solid, i.e., silica, silica-alumina, magnesia, magnesium carbonate, magnesium chloride, magnesium alkoxides such as magnesium methoxide, and the like. The weight ratio of titanium tetrahalide to carrier can vary from about 0.05:1 to about 1:1, more preferably from about 0.1:1 to about 0.3:1.

The catalysts of this invention are useful in the polymerization of at least one mono-1-olefin having 2 to 8 carbon atoms per molecule and are of particular utility in the polymerization of ethylene and copolymers containing a predominant amount of ethylene. The catalysts are of particular utility in the polymerization of ethylene or the copolymerization of ethylene and minor amounts of propylene, butene-1 or hexane-1, in an inert hydrocarbon diluent at a temperature at which the resulting polymer is insoluble in the diluent.

Broadly, the polymerization conditions employed in this invention are similar to other related processes in which a catalyst system comprising a titanium tetrahalide and an organoaluminum compound are used. In the preferred polymerization of ethylene in a particle form system wherein the resulting polymer does not go into solution, the polymerization temperature generally falls in the range of 0° to 150° C., more preferably about 40° to 112° C. Any convenient partial pressure of ethylene can be used. The partial pressure generally falls within the range of about 10 to 500 psig (69 to 3447 kPa). The concentration of titanium compound per liter of diluent during the polymerization can vary within the range of about 0.0005 to 10, more preferably from about 0.001 to 2 milliatoms titanium per liter of diluent.

The diluent used in the polymerization process is one which is unreactive under the conditions employed. The diluent is preferably a hydrocarbon such as isobutane, n-pentane, n-heptane, cyclohexane and the like.

As is known in the art, control of the molecular weight of the polymer can be obtained by the presence of hydrogen in the reactor during polymerization.

In general, the charge order of the various components to the reactor consists of adding the milled cocatalyst product, then the titanium compound and finally the diluent. Hydrogen, if used, is then added. The reactor and its contents are heated to the polymerization temperature, ethylene and comonomer, if used, are admitted and polymerization begins. Run times can vary from about ½ to 5 hours or longer.

It is to be noted that the product formed on mixing the cocatalyst and the titanium tetrahalide can be used directly to effect polymerization without the addition of an activator such as triethyl aluminum or other organoaluminum compounds. Thus subject to the provision that the catalyst can contain adjuvants, the final catalyst can be viewed as consisting essentially of the milled cocatalyst and the titanium tetrahalide.

The normally solid polymer produced utilizing the catalysts of this invention can be subsequently converted into useful items such as fibers, film, molded articles, and the like, by means of conventional plastics fabrication equipment.

EXAMPLE I

In a dry flask equipped with dripping funnel, reflux condenser and stirrer was placed 60 g (2.47 gram atoms) of 50 mesh magnesium powder. The vessel was purged with dry nitrogen and while maintaining this atmosphere, 263.5 g (2.47 gram atoms) of dry n-pentyl chloride was slowly added through the dropping funnel onto the gently stirred magnesium. The addition rate was sufficient to keep unreacting alkyl halide gently refluxing with total addition time of 4 hours. At the conclusion of the reaction, 300 ml of dry hexane were added to the flask and the mixture was heated to boiling for 4 hours as the contents were being stirred. Heating was then discontinued, the flask transferred to a dry box, and the hexane diluent was removed under reduced pressure leaving behind a gray solid as product.

Five gram portions of the powdered magnesium reducing agent were individually charged in a dry nitrogen purge to 12 ounce (355 ml) glass beverage bottles along with 50 g of ceramic balls, 25 ml of dry heptane and 3.26 g of diethylaluminum chloride contained as a 25 weight percent solution in dry heptane (amounting to 17 ml of solution). Each bottle was capped and milled the length of time shown in the Table.

A one-gallon (3.87 liter) stirred reactor, purged with dry nitrogen, was charged under an isobutane flush, with the milled cocatalyst mixture, and then titanium tetrachloride sufficient to give a calculated weight of 0.4 mg titanium (0.008 milligram atoms), hydrogen and 2 liters of dry isobutane as diluent. The reactor and its contents were heated to the chosen polymerization temperature, ethylene was admitted and a polymerization time of one hour was allowed per run. Each polymer was recovered by flashing off diluent and ethylene and the weight of polymer was determined.

The reaction temperatures used, amount of hydrogen used in each run, calculated atom ratios of Al/Mg and Al/Ti, productivity determined as grams polyethylene made per gram titanium and melt index results are given in Table I. Melt index is determined according to ASTM procedure D 1238-65T, condition E. The same procedure, condition F, is used to determine high load melt index (HLMI).

Table I

| Run No. | Atom Ratios | | $H_2$ Liters STP | Ethylene Partial Pressure kPa | Polymerization Temperature °C. | Cocatalyst Ball Milling Time, Hours | Catalyst Productivity g/g Ti | Melt Index | | Values HLMI | Remarks |
|---|---|---|---|---|---|---|---|---|---|---|---|
| | Al/Mg | Al/Ti | | | | | | MI | HLMI | MI | |
| 1 | 0.73 | 215 | 9.6 | 758 | 60 | 0 | 270,000 | nd[1] | 0.2 | na[2] | control |
| 2 | 0.73 | 215 | 9.6 | 758 | 60 | 1 | 490,000 | nd | 0.5 | na | invention |
| 3 | 0.73 | 215 | 9.6 | 758 | 60 | 3 | 760,000 | nd | 0.1 | na | invention |
| 4 | 0.73 | 215 | 9.6 | 758 | 60 | 10 | 660,000 | nd | nd | na | invention |
| 5 | 0.73 | 215 | 24 | 345 | 60 | 14 | 60,000 | 0.7 | 31 | 44 | invention |
| 6 | 0.73 | 215 | 24 | 552 | 60 | 14 | 140,000 | 0.9 | 36 | 40 | invention |
| 7 | 0.73 | 215 | 24 | 862 | 60 | 14 | 620,000 | nd | 3.5 | na | invention |
| 8 | 0.73 | 215 | 14.4 | 689 | 105 | 0 | 170,000 | 42 | nd | na | control |
| 9 | 0.73 | 215 | 5 | 689 | 105 | 0 | 440,000 | 0.20 | 5 | 25 | control |

Table I-continued

| Run No. | Atom Ratios Al/Mg | Atom Ratios Al/Ti | H$_2$ Liters STP | Ethylene Partial Pressure kPa | Ethylene Polymerization Polymerization Temperature °C. | Cocatalyst Ball Milling Time, Hours | Catalyst Productivity g/g Ti | Melt Index MI | Melt Index HLMI | Values HLMI MI | Remarks |
|---|---|---|---|---|---|---|---|---|---|---|---|
| 10 | 0.73 | 215 | 9.6 | 689 | 105 | 0 | 470,000 | 0.96 | 25 | 26 | control |
| 11 | 0.73 | 215 | 14 | 689 | 105 | 0 | 420,000 | 5.7 | 159 | 28 | control |
| 12 | 0.73 | 215 | 9.6 | 689 | 105 | 6 | 1,020,000 | 0.05 | 1.4 | 28 | invention |
| 13 | 0.73 | 215 | 19 | 689 | 105 | 6 | 1,170,000 | 0.11 | 3.5 | 32 | invention |
| 14 | 0.73 | 215 | 19 | 689 | 105 | 6 | 490,000 | 80 | nd | na | invention |
| 15 | 0.73 | 215 | 24 | 689 | 105 | 6 | 510,000 | 160 | nd | na | invention |

[1]nd is not determined.
[2]na is not applicable.
[a]Cocatalyst of runs 1–7 based on portions of same magnesium reducing agent/DEAC mixture.
[b]Cocatalyst of runs 8–11 based on portions of another magnesium reducing agent/DEAC mixture, the magneisum reducing agent simply being a different batch from that of the first batch, but prepared in the same way.
[c]Cocatalyst of runs 12–15 based on portions of another magnesium reducing agent/DEAC mixture, the magnesium reducing agent simply being a different batch from that of the first batch, but prepared in the same way.

At identical polymerization conditions, runs 1–4 indicate that productivity is increased when the cocatalyst component is ball milled prior to contact with the titanium tetrachloride. These data suggest that a ball milling period of about 3 hours is necessary to achieve the optimum effect in productivity in the inventive catalyst system. The improvement noted appears to be leveling out or perhaps even decreasing slightly with longer ball milling times as productivity results of run 4 (10 hours ball milling) are somewhat lower than productivity results of run 3 (3 hours ball milling). At any rate, substantially better results are obtained by ball milling the cocatalyst mixture compound to a control run employing a portion of the same cocatalyst mixture which is not ball milled. Runs 5–7 show that productivity is directly related to the ethylene partial pressure with more polymer being produced as the amount of ethylene charged to the reactor is increased. Runs 8–15 were conducted at a polymerization temperature of 105° C. compared to a polymerization temperature of 60° C. for runs 1–7. At similar hydrogen concentrations, the results indicate that more polymer is made at the higher temperature as run 10 (470,000 g polymer per g titanium) shows compared to control run 1 (270,000 g/g Ti). Runs 8–11 are identical in process conditions, each using portions of the same cocatalyst mixture, but differ in the amount of hydrogen present in the reactor. The results for runs 9–10, based on productivity and melt index values, appear to be about what is expected in this invention. However, run 8 values appear to be out of line, and it is believed the results should be ignored as being spurious; at least a partial cause of this is the relatively high level of hydrogen. The beneficial effects of ball milling the cocatalyst is demonstrated in run 12, all other conditions equal to runs 1 and 10, as productivity jumped to 1,020,000 g/g Ti. Runs 13 and 14 are similar to run 12 except more hydrogen is present in the reactor. Run 13 results suggest that much of the hydrogen might have been lost in this run since the productivity results and melt index results are fairly close to those of Run 12. Run 14 results are more indicative of what is expected, since with increased hydrogen present in the reactor, the melt index of the polymer is expected to increase and productivity is expected to decrease somewhat. This is also shown in Run 15. The depressing effect on productivity with increasing amount of hydrogen is also shown in the results of Runs 10 and 11.

The HLMI/MI values obtained indicate that the polymers made in this invention have relatively narrow molecular weight distributions. As the value increases, the molecular weight distribution also increases.

EXAMPLE II

This example compares the catalyst preparation steps of the invention wherein the cocatalyst is milled prior to contact with the titanium tetrahalide with the alternative procedure of either milling all three together or first milling the magnesium reducing agent and titanium tetrachloride, and thereafter contacting same with the organoaluminum compound.

| Run No. | Mg, g | DEAC ml | DEAC mmoles | TiCl$_4$ mmoles | Heptane, ml | Productivity, g/g Ti |
|---|---|---|---|---|---|---|
| 16 Invention (TiCl$_4$ added after organomagnesium cpd. reducing agent & DEAC are milled) | 5 | 17 | 27 | 0.032[1] | 25 | 125,000 |
| 17 Control (DEAC added after magnesium reducing agent and TiCl$_4$ are milled) | 5 | 17[1] | 27 | 0.032 | 25 | 49,000 |
| 18 Control (All 3, DEAC, organomagnesium cpd. reducing agent & TiCl$_4$, milled together) | 5 | 17 | 27 | 0.032 | 25 | 70,000 |

[1]Added after ball milling.

A duplicate run under slightly different conditions (0.53 mmoles TiCl$_4$) gave an advantage of 29,000 g polyethylene per g titanium in productivity between the invention sequence (as in Run 16), and a control sequence wherein the DEAC was added after ball milling (as in Run 17). The productivity in all of these runs was low, probably due to the use of an inferior batch of magnesium reducing agent. However, the comparative results between Runs 16, 17 and 18 are meaningful since the same techniques and reagents were used in these three runs. However, the results cannot properly be compared to Runs 1 to 15 so far as the absolute values for productivity are concerned.

These data show that the sequence steps of the invention are critical. Run 17 shows that an inferior result is obtained if the organoaluminum compound is added after the magnesium reducing agent and titanium have been contacted. Similarly, Run 18 shows that milling all three of the ingredients together gives an inferior result as compared with milling only the magnesium reducing agent and the organoaluminum component thereafter contacting same with the titanium tetrahalide. Thus, on a comparable basis, these data show an advantage for the sequence of the invention for ethylene polymerization.

While this invention has been described in detail for purpose of illustration, it is not be be construed as limited thereby but is intended to cover all changes and modifications within the spirit and scope thereof.

I claim:
1. A process comprising:
reacting an organic halide of the formula $RX$ or $R'X_2$ wherein X is a halogen atom, R is an alkynyl, alkenyl, alkyl, aryl, cycloalkenyl, or cycloalkyl radical or combination thereof having 1 to 12 carbon atoms per molecule, and R' is a saturated divalent aliphatic hydrocarbon radical containing from 2 to 10 carbon atoms per molecule and magnesium metal in the absence of any complexing diluent to form a magnesium reducing agent reaction mixture containing at least 10 weight percent each of a diorganomagnesium compound and a magnesium halide, the ratio of moles of said organic halide to atoms of said magnesium being within the range of 0.25:1 to 1:0.25;
milling under intensive conditions wherein heat is generated and agglomerates are broken up using one of ball milling, rod milling, pebble milling, vibratory ball milling or colloid milling, the total magnesium reducing agent reaction mixture thus produced with an organoaluminum compound having the formula $R''_2AlX$ wherein X is a halogen and R'' is an alkyl or aryl radical having 1 to 12 carbon atoms to give a milled cocatalyst product wherein the atom ratio of aluminum to magnesium is within the range of 0.1:1 to 4:1; and
thereafter contacting said milled cocatalyst product with a titanium tetrahalide to give a catalyst wherein said catalyst has an atom ratio of aluminum to titanium within the range of 20:1 to 10,000:1.

2. A method according to claim 1 wherein said organic halide is added slowly to said magnesium metal in the absence of any extraneous diluent.

3. A method according to claim 1 wherein said organic halide is added dropwise to said magnesium metal in the absence of any extraneous diluent.

4. A method according to claim 1 wherein there is present in addition a polar organic adjuvant which is an electron donor compound.

5. A method according to claim 1 wherein said titanium tetrahalide is titanium tetrachloride.

6. A method according to claim 5 wherein said organic halide has the formula RX wherein X represents chlorine or bromine and R is an alkynyl, alkenyl, alkyl, aryl, cycloalkenyl, or cycloalkyl radical having 1 to 12 carbon atoms.

7. A method according to claim 6 wherein the atom ratio of aluminum to titanium is within the range of 75:1 to 5,000:1, the atom ratio of aluminum to magnesium is within the range of 0.5:1 to 2:1 and wherein said organic halide is added to said magnesium in an about stoichiometric amount.

8. A method according to claim 7 wherein said milling is done by one of ball milling, rod milling, or pebble milling for a time within the range of 0.1 to 20 hours.

9. A method according to claim 8 wherein said milling is done by ball milling for a time within the range of 2 to 5 hours.

10. A method according to claim 9 wherein said organic halide is n-pentylchloride and said organoaluminum compound is diethylaluminum chloride.

11. A method according to claim 10 wherein said organic halide is added dropwise to said magnesium metal in the absence of any extraneous diluent.

12. A catalyst produced by the method of claim 11.

13. A catalyst produced by the method of claim 1.

14. A polymerization process comprising contacting at least one mono-1-olefin under polymerization conditions with the catalyst of claim 1.

15. A method according to claim 14 wherein said at least one mono-1-olefin is predominantly ethylene.

16. A method according to claim 15 wherein said polymerization process is carried out in the presence of a diluent under conditions of temperature and pressure such that said diluent is in the liquid phase and the resulting polymer is insoluble in said diluent, said catalyst being used without the subsequent addition of an activator.

* * * * *